Oct. 19, 1943.  R. G. DREW  2,332,137
ADHESIVE SHEETING
Filed June 10, 1933
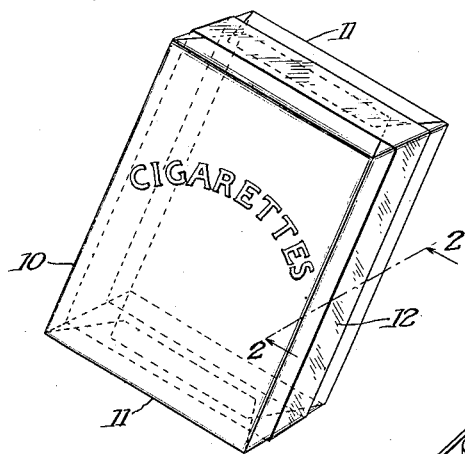
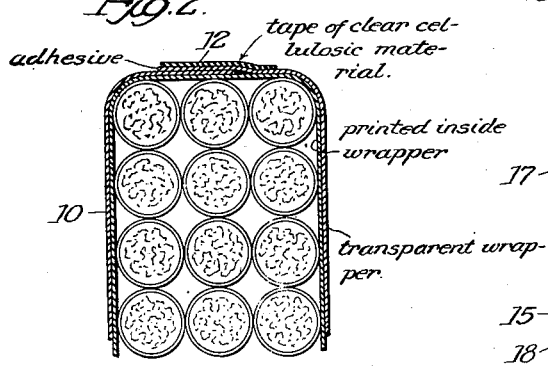
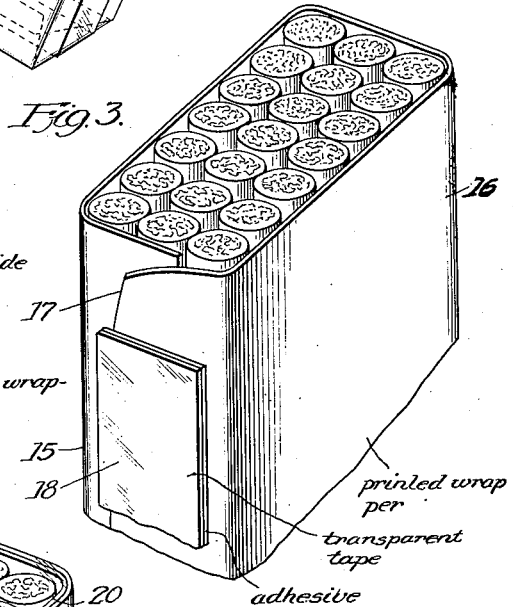
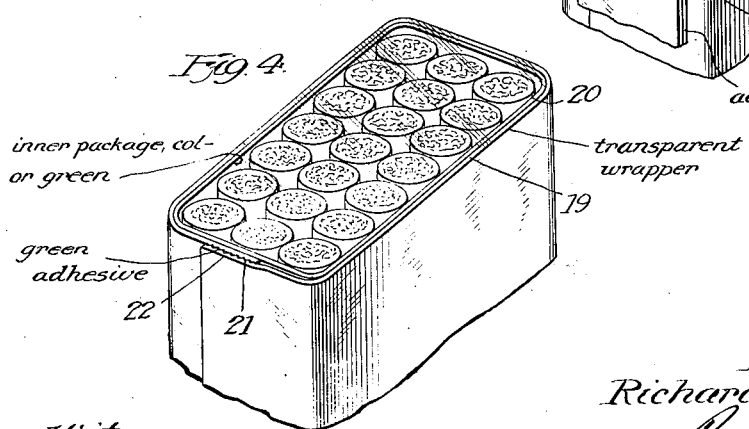
Inventor:
Richard Gurley Drew _Patented Oct. 19, 1943_  2,332,137

UNITED STATES PATENT OFFICE 2,332,137

ADHESIVE SHEETING

Richard Gurley Drew, St. Paul, Minn., assignor to Minnesota Mining & Manufacturing Company, St. Paul, Minn., a corporation of Delaware Application June 10, 1933, Serial No. 675,291

5 Claims. (Cl. 117—122)

This invention relates to tapes; more particularly, to transparent tapes, carrying an adhesive; and to methods of making such article, the adhesive compositions carried thereby and to new and useful methods of applying this article.

Recent developments have found it desirable to use as a packaging and merchandising material, thin and transparent sheeted material for its natural display qualities, and serving in the nature of a waterproofing fabric or covering for a layer of printing matter or for the merchandise itself. This packaging material comprises gelatinized cellulosic materials, which result in transparent films, such as regenerated cellulose, cellulose esters, such as cellulose nitrate, cellulose acetate or cellulose ethers, such as ethyl cellulose, or sheets comprising composites of such gelatinized cellulosic materials, such as a layer or film of regenerated cellulose combined with a layer or film of cellulosic compounds. The popularity of these materials resides in such qualities as brilliancy, sheen and transparency, and in the later development of such material, in the waterproofness of this type of packaging material.

In using such transparent films, particularly as result from sheeted regenerated cellulose, the highly glazed surface and character of this sheet have made present types of adhesive unsuitable for adhesively applying this type of sheet or film in position, or for sealing a package made thereof into firm and waterproof contact. Thus where present day adhesives may be useful with paper for sealing a fibrous type of sheeted material, with highly polished transparent sheets, these adhesives are ineffective as a seal, are non-adherent, as well as objectionable in that they modify the transparent characteristic of the packaging material, film or sheet and detract from its desirable appearance.

In using gelatinized cellulose sheets for packaging purposes in which the waterproof characteristics of the film are found desirable, present adhesives are further objectionable, in that they are non-adherent to this type of film and thereby the hermetic sealing characteristic of this sheeting is ineffective. Furthermore, in using gelatinized cellulosic sheeting material, such as known on the market as ordinary Cellophane, the hygroscopic characteristics of this sheeting material have made it objectionable as well as highly undesirable to use an ordinary glue bond as the sole adhesive in that a coating of such adhesive, as well as the moistening operation necessary for applying the same, will unduly warp and curl the transparent sheeting material and deface the package upon which it is used.

It is therefore an object of my invention to provide a sheeted fabric of such material, such as gelatinized cellulosic material, and provide the same with an adhesive therefor, or a coating thereon which in no way interferes with the desirable properties of this transparent film while augmenting the characteristics of waterproofness, where this quality is desirable.

It is contemplated by my invention to provide a transparent film made of gelatinized cellulosic materials, and unified with an adhesive coating which will in no way interfere with the desirable transparent characteristics of this material. It is further contemplated by my invention to provide sheets of transparent gelatinized cellulosic material with an adhesive coating, which will not alter the transparent characteristics of the film by reason of its presence or by reason of the method of application, in the position desired.

It is a further object of my invention to provide tape made of transparent sheeting which constitutes gelatinized cellulosic materials with a unified adherent coating of adhesive material, permitting the composite to be stacked or formed into rolls and applied to use without disfiguring or altering the transparent characteristics of the film in that the energizing of the adhesive does not in any way alter the characteristics of the transparent film. Thus, it is contemplated by my invention to provide transparent sheeting material, such as that made of gelatinized cellulosic material, with a water soluble or insoluble adhesive coating which, in itself, is transparent and which permits application of this film wherever desired, without alteration of the transparent film.

It is a further object of my invention to provide an adhesive tape which has utility for sealing, and will not detract from the display of the wrapper or container, characteristic of using a transparent sheeted material carrying an adhesive coat. It is contemplated by me to provide a transparent web or sheet, with a united adhesive coat, the composite of the adhesive and sheet being substantially transparent and the adhesion of the adhesive coat to the web having all the tenacious qualities characteristic of applying the adhesive layer to a fibrous type of sheeted material.

It is further contemplated by my invention to provide a method for preparing an adhesive tape or webbing, in sheet form, which has all the transparency, flexibility and water-proofness characteristic of gelatinized cellulosic materials, and the strength of unification between the cellulosic sheeted material and when the adhesive coating is energized to adhesiveness, such change may be accomplished without in any way detracting from the transparent characteristics of the composite backing material and adhesive coating.

In preparing an article of the character contemplated by me, comprising a transparent backing material, carrying an adhesive coat, it is preferred that the backing material comprises gelatinized cellulosic materials which result in transparent films, such as regenerated cellulose, cellulose esters, cellulose ethers, such as cellulose nitrate, cellulose acetate or ethyl cellulose, or composites of such gelatinized cellulosic materials, such as a layer of regenerated cellulose combined with a layer or layers of cellulosic compounds. I may further utilize a backing material comprising transparent or semi-transparent sheets made from materials other than cellulosic material, and which may include a film of waterproofing material, such as films made of cellulosic compounds, varnishes, lacquers or the like. Such backing materials may include glassine paper or paper treated to approach transparency and may be used with a certain degree of desirable results.

In its preferred form, my invention is particularly applicable to transparent films of gelatinized cellulosic materials, such as regenerated cellulose, which is clear, transparent or lustrous.

The product so made, though desirable for a great many purposes, has a tendency to be hygroscopic. It is preferred, therefore, to waterproof the film so produced, either on one side or on both sides, with a thin film of nitro-cellulose, cellulose acetate, cellulose ether, and similar cellulosic compounds. It will be understood that the waterproofing ingredients may include oxidized oils, varnishes and lacquers. The primary requisite is the application of these waterproofing films so as not to impair the lustrous and transparent characteristics of the sheet formed and to overcome any tendency to provide a warped sheet by the waterproofing layer that may be applied.

Additionally, coatings such as transparent rubber, synthetic resins, and like materials may be used as a waterproof coating.

In the use of the film as thus provided as a backing material for adhesive tape or for purposes of adhering adhesive tapes thereto, ordinary glue type adhesive tapes are unsufficiently adherent by reason of the highly glazed surface provided by this type of backing material. The use of ordinary adhesive tapes detracts from the package formed, where the transparent film is used as the packaging material.

I have found that I may utilize the transparent films of the character above described, having a highly polished, lustrous surface, and form a seal therefor or an adhesive tape therefrom by applying thereto an adhesive layer which is in elastic equilibrium with the backing materials so that it has the full adhesive qualities and does not interfere with or disfigure the transparent or lustrous qualities of the backing material or the sheet to which it is applied by reason of any tendency to warp or curl the same, or where utilized with a backing material of the character described and referred to as gelatinized cellulosic material, whether transparent, colored, opaque or translucent, when coated with an adhesive of the character herein described, made to be in elastic adhesive equilibrium, such film of material may be used and will expose its lustrous surface free from a warped or disfigured effect by reason of the fact that it carries the layer of adhesive.

In use, the adhesive hereafter to be described, may be directly applied to the backing or sheets of transparent gelatinized cellulosic materials, previously enumerated, and forms a desirable product. Where a sheet is made of gelatinized cellulosic material which includes a waterproof coating, the adhesives as described may be directly applied, with very efficient results.

Where considerable unification is desired between the adhesive layer and the backing material, to assure proper anchorage of the adhesive layer with the backing material, thereby assuring satisfactory unwinding or separation when the composite is formed into rolls or stacks, it is preferred to first coat the sheet of gelatinized cellulosic material with a priming composition. Priming of one surface is particularly effective with sheets formed of regenerated cellulose. The priming operation consists of first coating the backing material before application of the adhesive materials previously described.

The priming composition as preferred by me is a solution of a rubber-resin mixture in an organic solvent in which the solid materials may be varied from 15 to 50%, with 85 to 50% of the solvents used. Preferably, the solids constitute about 17% of the solution so prepared.

PRIMER TYPE 1

A preferred composition comprises:

| | Parts |
|---|---|
| Rubber (latex crepe) | 2 |
| Resin (such as pine pitch or wood rosin) | 4 |
| A filler, such as whiting (optional) | 1 |

These two or three ingredients, as listed, constitute the solid components in the priming mixture above enumerated.

The priming composition so prepared is one which, upon deposition and volatilization of the solvent, will exhibit slow solubility upon treatment with the same solvent. In general, it is preferred, therefore, that the deposition product resulting from coating with the priming composition be one whose solid components retard the solvent action of the overlying material when coated thereon as a solution. That is, the solids which may be contained and are present in the primer composition are of such a nature that after deposition they are difficultly soluble in the solvent used for plasticizing and coating the adhesive layer. In the example above given, such properties may be imparted to the deposition product by utilizing rubber which has been partially vulcanized, this solution being effected by plasticizing in a mixing device such as an internal mixer in the presence of heat, sufficient to render the mass sticky. As an additional operation, a solvent retardant may be added and, to a certain extent, the filler indicated in Primer type 1 above serves this purpose. Though whiting is illustrated and preferred, those fillers which tend to exert an insolubilizing effect upon the rubber may also be used, such as zinc oxide.

Though it is indicated that high grade vulcanized rubber, plasticized to tackiness, may be utilized with some degree of success in the example above cited and identified as Primer type 1, it is preferred, particularly where transparency is desired, to use the combination of ingredients above identified, and to merely add during the mixing operation the requisite quantity of sulfur and accelerators. The quantity of these ingredients if any is merely sufficient to render the rubber component difficultly soluble in the solvent present in the solution of the adhesive composition, so made for spreading purposes, without reducing the quality of this priming coat to unify with the adhesive layer superimposed thereover.

PRIMER No. 2

Rubber, in the form commonly referred to as latex crepe, with the resin content, in the proportions above indicated has added thereto sulfur and accelerators. These are vulcanized with heat after intimate admixture and while in the softened condition, are mechanically milled until a sticky mass, soluble in benzol or naphtha, is obtained. The amount of benzol or naphtha added is to obtain the requisite fluidity and these solvents may be added to the solid components in quantities of from 50 to 85%, as compared with the rubber and resin content.

Additional examples of primers which anchor the adhesive coating to regenerated cellulose such as Cellophane waterproofed or untreated (ordinary), are as follows:

PRIMER No. 3

| | Parts |
|---|---|
| Selected tube reclaim rubber | 90 |
| Latex crepe rubber | 10 |
| Whiting | 40 |
| FF wood rosin | 140 |

PRIMER No. 4

| | Parts |
|---|---|
| FF wood rosin | 2 |
| Rubber (latex crepe) | 1 |

PRIMER No. 5

| | Parts |
|---|---|
| FF wood rosin | 2 |
| Rubber digested with alkali to remove non-rubber hydrocarbons (crude rubber or latex crepe may be thus digested with alkali for the purpose stated) | 1 |

PRIMER No. 6

| | Parts |
|---|---|
| Selected inner tube reclaimed rubber treated further to remove pigment | 90 |
| Latex crepe rubber | 10 |
| FF wood rosin, preferably Solros (a soluble resin whose soluble constituents and melting point are increased by a distillation process) | 140 |

This last primer is particularly transparent, and useful in connection with regenerated cellulose, such as Cellophane, ordinary uncoated or that which is waterproofed by an additional film, a material which renders it non-hygroscopic.

The primers above described under 1 and 2 may be further rendered resistant to the solvent action of the overlying adhesive to be applied in a subsequent step by the use of a priming composition which, upon aeration after application to the backing material, becomes vulcanized. Such material may be a material known on the market as Vulcoloc. This material is to the best of my knowledge, a reaction product of rubber and a sulphur bearing acid.

In its use, Vulcoloc is applied to the backing material and the layer so applied is permitted to age, to result in ageing and vulcanization of the rubber used in the primer, prior to the application of the solution of adhesive material. Application of an organic solution of the adhesive does not effect the coating of the Vulcoloc primer as applied.

Another material particularly suitable because of its inertness to solvents of unvulcanized rubber where this material constitutes the water insoluble rubber base adhesive coating, is an artificial or synthetic rubber known as duprene, which is probably a polymerized diolefine compound.

In general, the primer layer is one which makes satisfactory bond with the regenerated cellulose backing material, or the gelatinized cellulosic material constituting such backing material, which may include a waterproofing layer of cellulosic compounds. Such material may be a layer of a synthetic resin, such as one of the group of polyhydric resins which makes excellent union with gelatinized cellulosic materials and with rubber. In the event that it is desired to wholly eliminate the primer layer and waterproof the backing material of regenerated cellulose, where this is used, the waterproofing layer over the regenerated cellulose backing material is one which has affinity for the adhesive coating with which the adhesive coating makes better anchorage than would be the case if the regenerated cellulosic film alone were used. Such waterproofing materials may be a highly plasticized nitrocellulose or cellulose acetate, oxidized and gelatinized drying oils, synthetic resins, such as phenolic condensation resins, or those of water white characteristics, such as urea resins. Those ingredients are chosen, as above indicated, which will be difficultly soluble in the solvent used in the solution of the adhesive layer composition subsequently applied thereto so as not to disrupt the waterproofing coating where the priming layer is used for this purpose, or prevent dissolving the dry priming coating, to thereby provide a weakened structure preventing proper unification between the adhesive coating and the backing material.

The method of application of the coating materials above described will, to a large extent, depend upon the character of the coating. The primer and adhesive coatings may be successively applied where these are used in solutions of volatile solvents, by an offset process from rollers uniformly coated with the primer composition or the adhesive composition. With the more viscous composition of either primer or adhesive, these layers may be coated upon the backing by a knife spreader. For the more plastic form of either composition and where unification is desired, calendering or frictioning of these materials may be resorted to, to apply either the priming coat or the adhesive coat, or both.

As an example of one method which may be followed in preparing the composite, the following procedure is recommended: a web of regenerated cellulose film of the desired thickness is carried through a set of vertically positioned squeeze rolls. The lower roll has transferred to it, or dips into the solution of the primer composition. A uniform layer of primer is applied at this point to the film or web of backing material. The web thus prepared travels from the squeeze rolls, to a duct for removing and drying off the solvents in the primer. The web then is directed to a contrivance for coating, at which point a doctor knife or coating knife is used to spread a film of the composition of adhesive material. This composition is directly applied over the primer, and where a solvent is included by the adhesive composition, the composite as coated is either hung in festoons or travels through a drying duct, at which point sufficient time is allowed for complete removal of the solvent, and to form the deposition product to the desired consistency, due to the solid components present, for tackiness. If heat has been utilized to separate the solvent from the deposition product resulting in the adhesive, the composite thus formed may be cooled and brought to room temperatures, to render the product more convenient for stacking or winding into rolls. Where wound into rolls, the composite thus formed is then cut or converted into small rolls, suitable for trade requirements.

As indicated, the adhesive layer is unified in that it has great adhesion inter se and when applied as indicated, forms a unified product with the backing material. When wound into rolls or formed into stacks, the lustrous surface of the backing will not be modified, no offsetting will occur and ready separation is assured of the entire composite from its adjacent layer. Where the product is to be used in temperate climates and may encounter higher temperatures, it may be desirable to coat the back side of the backing material with a thin film of glycerine or lightly dust this surface with talc, flour or starch. In such event, a protective coating is applied which is not disintegrated by or which does not interfere with the adhesive action of the adhesive layer.

Though it is preferred to apply this protective layer to the composite opposite to the adhesive coating, this layer of material may be carried by the composite in a manner to assure its interpositioning between layers of adhesive material and backing material, when the composite is formed into stacks or rolls and it will be readily understood that this material will then act in the nature of slip sheeting when the article is thus formed. It will be understood, however, that under ordinary conditions, the composite of backing material and adhesive layer as hereinbefore described is a complete unified product and no further treatment need be made.

Though I have described the adhesive coating as being directly applicable to transparent sheets of cellulosic material or regenerated cellulose, such as Cellophane, or to cellulosic compounds such as cellulose esters of which cellulose nitrate, cellulose acetate enumerated above are examples, where the backing material comprises plasticizing materials to render the sheets supple and flexible, merging of the plasticizer of the backing with the adhesive coating may be avoided to modify the backing material by the adhesive coating directly mounted thereon, or when the backing material and the adhesive are wound into rolls or formed into stacks. To avoid this modification, it is preferred, where using cellulosic compounds such as the material from which the backing materials is made, and which may include large percentages of plasticizers, to provide such sheets with thin films of cellulose acetate or nitrate of relatively low or substantially free of plasticizers.

In the procedure heretofore described in my prior applications herein mentioned, I have indicated that it is preferred to have the adhesive coating as one which is normally tacky or pressure sensitive and that the adhesive layer is in adhesive equilibrium with the backing material described, to preserve the luster and sheen of the backing or its transparency, where this is desirable. It may be desirable, under certain conditions, to modify the adhesive layer to a condition where it is normally "dry" and is not normally pressure sensitive but may be energized to become adhesive by a moistening agent, to render it suitable for application as a seal, adhesive member, etc.

I have found that I may retain all the desirable characteristics of using a transparent backing material, or a highly polished and lustrous backing material, together with an adhesive layer and maintain the composite so formed in elastic adhesive equilibrium, to retain the highly polished, lustrous and/or transparent characteristics of the backing material, by a variation in the components of the adhesive layer, to obtain a product in which the adhesive layer is normally dry, and that I may further retain all these desirable characteristics, even though applying a moistening agent which serves to energize and render adhesive the normally dry coating or layer of adhesive material. Such a material as contemplated by me is one which is suitable for use in a dispenser type of applicator for adhesive tapes. In this type of article generally, a roll of the composite adhesive tape is fed in contact with a moistening agent, which exerts a solvent action upon the adhesive layer and thereby activates it and renders it sticky. In this condition, the tape or layer of material is applied for permanent adhesion as a seal or tie for a package, or for other purposes, such as packaging or covering arrangement. Upon setting or drying of the adhesive layer thus moistened, permanent adhesion is experienced, even when the adhesive is contacted and applied to highly polished lustrous surfaces, characteristic of gelatinized cellulosic materials, cellulosic films or, in fact, any other type of surface. The exposed back of this tape or layer carrying the adhesive is not affected by the moistening and drying action and will expose the backing material with substantially its original lustrous and highly polished surface, and with the transparency of the original material, where this type of composite is used. Where used for a seal, the joints are of exceedingly high strength and are waterproof in character. The tape so formed is particularly suitable in connection with films of regenerated cellulose, whether waterproof or not, and is capable of use whereas an ordinary glue base adhesive when used alone will otherwise alter and warp the regenerated cellulose film (where this is used).

As an example of the adhesive layer in making a composite of the character above described, the product may be made as follows:

FORMULA E*a*

| | Parts |
|---|---|
| Reclaimed rubber (selected tire tube reclaim) | 90 |
| Fresh rubber (latex crepe) | 10 |
| Zinc oxide | 86 |
| Water white rosin | 140 |

The rubber components are milled thoroughly with the zinc oxide, then dissolved in a suitable solvent which carries the rosin in solution and the entire mixture is then stirred to a smooth and homogeneous product. The quantity of solvent used in connection with the above is in accordance with the heretofore cited examples of adhesives and, in general, benzol may be used as a solvent. The solid components may constitute from 50 to 15% whereas the solvent may be from 50 to 85%. Preferably 17% solids to 83% solvent is used.

As a variation from the above, an adhesive coating of the character above referred to may be prepared from the following:

FORMULA F

Solution A

| | Pounds |
|---|---|
| Rubber (latex crepe) | 50 |
| Zinc oxide | 50 |
| Rosin | 250 |

Solution B

| | Pounds |
|---|---|
| Hide glue | 100 |
| Water | 200 |

Solution A is first prepared by dissolving the solid components comprising rubber and rosin in an organic solvent. The solvent is preferably benzol from 50 to 85% of the mixture as compared with 50 to 15% of the solids. Preferably, however, Solution A is one which constitutes 30% of solids and 70% of solvent.

Solution A may be made by milling the rubber with the zinc oxide and the rosin and then adding the organic solvent, comprising benzol. Preferably, however, the rubber is milled, has added to it gradually the zinc oxide component and during the milling operation of these two, the rosin component dissolved in the solvent is gradually added until the dissolution of the components is effected.

Solution B is prepared by swelling the hide glue in a minimum quantity of water over night and then after the hide glue has been completely softened, the full water component is added. The adhesive as contemplated by this formula is completely prepared by emulsifying the glue solution and the rubber solution so that the rubber solution is in the continuous phase and the glue solution in the dispersed phase.

In the above example, corn starch and dextrin may be substituted for the hide glue. Mixtures of glue and corn starch have also been found desirable.

As a still further variations of the above, I may prepare an adhesive suitable for my purpose in making a dry adhesive as follows:

FORMULA G

| | Pounds |
|---|---|
| Rubber (preferably thin latex crepe) | 262 |
| Zinc oxide | 262 |
| Wood rosin (preferably Solros) | 1,300 |

The mixture as above indicated is made by milling the rubber and zinc components and then adding enough benzol to place the rubber in solution and thoroughly sustain the zinc oxide. When solution has been effected, the rosin, in benzol, is added and the entire batch mixed to effect a thorough distribution of the rosin and the rubber components. The rosin as chosen in the above example and known on the market as Solros is one which has been particularly treated to render it non-crystalline, and to reduce the quantity of its components which are insoluble in mineral oil.

In the examples cited above under Formulae E, F and G, the quantity of the rosin as compared with the rubber will be determined by the reduction of tackiness which may be desired to be imparted to the rubber and the requisite speed of setting and hardening of the adhesive surface after moistening and application of the composite carrying it. The larger quantities of the resin added in proportion to the rubber, the slower will be the action of setting after volatilization of the solvent which the reduction of the resin will tend to retain tackiness in the adhesive coat. I may add from 1.4 to 6 times the quantity of resinous material, particularly those resins described, to rubber and retain the desirable characteristics of the adhesive coat in the final sheet.

Though I have described as a particular relationship of resinous material to rubber as coming within the range of ¼ to 6 parts of resinous material to one part of rubber, a particularly desirable form of solvent activatable adhesive coating may be obtained from the following:

FORMULA Ga

| | Parts |
|---|---|
| W. w. rosin (water white) | 3 |
| Flexo resin | 3.2 |
| Zinc oxide | 2.0 |
| Latex crepe | 2.0 |
| Oleum spirits | 12 |

The flexo resin above referred to is an oxidized and polymerized terpene, polymerization being effected concurrently with partial air oxidation.

In the formula above given, the zinc oxide may, wherever specified, be omitted.

Though the ingredients above given are preferred, the ingredients may be varied within wide limits.

It would be desirable to observe the relationship of the rosin and the flexo resin mentioned so as to retain the rosin from 2 to 5 parts and the flexo resin from 3 to 6 parts.

In general, the latitude allowable is preferably such as to have the relationship of these ingredients in connection with the latex crepe and oleum spirits, such as to maintain a relationship of 2 parts of rosin and 3 parts of flexo resin, to 5 parts of rosin and 6 parts of flexo resin. The total resin-rosin content should preferably be kept above 5 parts and below 11 parts, as the limit below the lower figure tends to give a product which is too tacky, and the higher figure, a product which is too brittle.

In the formulae given, the zinc oxide content may be varied from one half to four parts, though as previously stated, this ingredient may be omitted.

In the above formula, oleum spirits have been referred to. This is a hydrocarbon solvent of indefinite boiling point, its boiling range falling between its initial boiling point of 306 degrees F. and its end point of 424 degrees F.

Though I have included in the formulae illustrated an ingredient which is not soluble in the mixture of rubber and resin, such as zinc oxide in the formulae E and G, and zinc oxide and an aqueous ingredient in Formula F, these are cited merely by way of example. In general, they are included where the tape is submitted to a rubbing action during the moistening operation and some degree of body is desired to be imparted to the film forming the adhesive layer and also where a proper moistening of the film is desired without displacement due to such solvent action as the moistening agent may exert upon the adhesive film.

Thus, in the Examples Ea and G, zinc oxide, and in Example F, zinc oxide and dispersed glue act, to a certain extent, to properly control the moistening action upon the adhesive layer by the moistening agent that may be used, serving in the nature of a film control filler.

The adhesive as prepared in solution in the requisite solvent, such as benzol, is applied to a backing material, as by the method aforesaid, such as by passing the film of backing material through a set of squeeze rolls, one of which dips into the solution of the adhesive material to transfer the adhesive to the backing material, after which the solvent is removed by passing the web of material through suitable drying chambers or ducts. Though the application of the adhesive to the backing material may be preceded by a priming coat and though this is found desirable in applying a normally tacky and pressure sensitive adhesive coating, this is not found necessary in applying the aforementioned adhesive, which is intended to leave a dry coating as the adhesion of the adhesive compositions, including the high quantity of rosin or resinous material, is so intense as not to require this preliminary treatment. Especially is this true when applying the formulae of adhesives under Examples E, F and G to a fibrous type of backing material. This type of adhesive is particularly useful for this purpose and instead of utilizing the highly lustrous, glossy and/or transparent films of gelatinized cellulosic material, the adhesive thus described, suitable for forming a dry surface, is admirably suitable for application to paper backing material, such as kraft paper. In this direction it is preferred that such paper known as sixty pound kraft paper be utilized. I may also use "unified" backing material prepared in accordance with my application, S. N. 281,104, now Patent No. 1,760,820. Where the paper has been "unified" by an impregnation with a glue base material, a priming coat may be desirable and the primers described in my last mentioned patent may be used.

The backing materials, including the adhesive coating as above described, may then upon drying of the adhesive, be directly formed into rolls or stacked. Where a fast setting adhesive coating is found desirable so that a lower quantity of resinous material is used in proportion to the rubber component, there may be a tendency, especially in the warmer climates, for the adhesive coating to have a tacky reaction, particularly at the time when the web of material is wound into rolls. At this point, the unwinding properties may be improved by dusting talc or starch upon the composite formed by the paper and adhesive, so that a separating coat of starch or talc lies between the paper and adhesive surface when webs of this composite are formed into rolls. Preferably this may be accomplished by dusting with a minute quantity of starch or talc, the dry coating of adhesive.

While I have above described the preferred range and specific percentage of solids to solvents for the primer composition, it will be understood that the solids may constitute 100 to 0% and that where 100% solids are used, the method of application described previously in the specification may be used. Where no solids are used, the solvent is applied just immediately preceding the application of the adhesive coat. While still wet the adhesive coat is applied to assure greater anchorage of the adhesive coating to the backing by its solvent action on the coating and backing material.

Where pyroxylin is used for the waterproof layer covering a regenerated cellulose sheet or one already coated with a sealing coat of this material, it may be plasticized by a quantity of resinous materials in proportions of about 67% to 50% of resinous material to about 33% to 50% of nitrocellulose material. Under such conditions, the solvent necessary to render the waterproof coat active for adhesion may be the ordinary known solvents for nitrocellulose without modification. In such event, no other coating of adhesive material need be applied. As a more particular formula for the coating composition, the following is an illustration, viz:

| | Pounds |
|---|---|
| Nitrocellulose, such as "½ second cotton" | 9 |
| Cellosolve, which is ethylene glycol monoethyl-ether ($C_4H_{10}O_2$) | 15 |
| Resin such as Rezyl 12, which is a condensation product of castor oil and phthalic anhydride | 12 |
| Dammar cut, which is a solution in the proportion of 40% dammar resin and 60% benzol | 16 |

The above composition may form the adhesive coating of a normally dry character upon volatilization of the solvents and may be activated to adhesiveness by the normal solvents for nitrocellulose.

A composite as made in accordance with the above may be mounted upon a dispenser of the kind now generally used in connection with glue bond adhesive tape and the adhesive surface may be activated by organic volatile solvents, such as gasoline or benzol. These solvents, though inflammable, may be readily utilized if care is exercised to prevent the volatile portions of these solvents from coming in direct contact with highly heated objects or open flames. Otherwise, non-inflammable chlorinated hydrocarbons, such as carbon tetrachloride or ethylene di-chloride may be employed. When moistened by organic solvents, particularly those above enumerated, the adhesive film becomes rapidly activated and may be immediately applied to a large number of surfaces and will set with greater rapidity than that experienced with adhesive tape which is moistened with water and utilizes a glue base adhesive layer. When the coating as above described is applied to the films of gelatinized cellulosic materials, the lustre and brilliancy of the film will not be impaired and where this backing material is transparent, no warping will occur which will tend to defeat the purpose of using this type of material, as the adhesive layer, as in the case previously enumerated, is in elastic equilibrium with said surface to which it is applied or with which it comes in contact. Any packaging material using this seal will stand crumbling or sharp bending without becoming disengaged at the point so sealed.

Where the film of backing material comprises composites of gelatinized cellulosic materials, such as regenerated cellulose coated with cellulosic compounds, such as nitrocellulose or those other waterproofing ingredients previously enumerated as used in connection with regenerated cellulosic films, the dispensor type of adhesive enumerated under Formulae E, Ea, F and G may be directly applied. Greater tenacity may be experienced with regenerated cellulose surfaces, particularly those which may have been softened by the addition of glycerine, by the addition of small percentages of the primers heretofore described, to the adhesive enumerated under Formulae E, Ea, F and G, or by the application of a primer layer of the character hereinbefore described.

When the dispenser type of adhesive is applied to paper backing material, moistening of the adhesive with an organic solvent before application for a seal or similar purposes, will not weaken the paper even though the moistening agent may be excessively applied and the full strength of the backing material is retained. Where used upon transparent backing material, such as gelatinized cellulosic films, the adhesive after setting will tenaciously affix itself to the highly polished surfaces and will thereby form an effective waterproof and water tight seal.

Coated upon paper backing, a more positive adhesion is obtained in its application to various uses. A greater rapidity in setting lends itself towards a more rapid fabrication in such processes as may involve the use of adhesive tapes, such as in the fabrication of cartons, paper boxes or similar products. Similarly, paper coated with these adhesives may be made up into corrugated boards with great rapidity and provide a resulting product of great strength in that it resists the moistening action resulting in storing the products contained in such packages under conditions which would ordinarily disintegrate and weaken glue base adhesive products. Thus, dressed meats and dairy products may be stored in cartons utilizing this type of adhesive tape, and be stored in refrigerated rooms for long periods of time without disintegration. The adhesive will equally adhere to asphalt coated paper or wax coated fabrics or paper treated in this fashion, to be resistant to oils and fats and obtain secure adhesion and proper anchorage. The composite of adhesive and backing material is valuable in providing a product which is absolutely impervious to high humidities and permits direct application of water without disintegration. The composites of backing material and adhesive will not become disintegrated or become weakened or inactive by prolonged storage under moist or adverse storage conditions, detrimental to present day glue base adhesive tapes.

In the examples enumerated, normally dry solvent activatable adhesive coatings have been specified, that is, that which may be activated by the application of an organic solvent, it is to be observed that such coatings which are normally dry may be activated to adhesiveness by the application of heat and the activation to adhesiveness may be made more rapid by combined action of the solvents and heat.

To illustrate the new and novel article as herein provided, and the method of using the same, resulting in new and novel methods of packaging, reference is made to the accompanying drawings, forming a part hereof, in which—

Figure 1 is a perspective view of a package made in accordance with my invention;

Figure 2 is a section taken on the line 2—2 of Figure 1;

Figure 3 is a fragmentary perspective view of another embodiment of my invention;

Figure 4 is a fragmentary perspective view of another embodiment of my invention;

The method of wrapping and packaging, as contemplated by me, in one of its embodiments, resides in providing a transparent wrapping material 10, made of transparent films or sheets, preferably comprising gelatinized cellulosic material, such as regenerated cellulose, a form of which product is known on the market as Cellophane. In the preferred form as utilized by me, this gelatinized cellulosic film has coated on both sides thereof transparent coatings of waterproofing material, such as plasticized pyroxylin. In the illustration shown, a sheet of this material is wrapped about the article, which may be the goods themselves, such as in displaying packages of nuts, dates, candy, meats or the like, or articles already packaged in printed material, such as candy, cigars and cigarettes. This wrapping material is formed about the article, the edges being folded over or superimposed, as shown at 11. Over these superimposed edges, I may affix a layer of tape 12. The tape 12 may comprise any of the composite adhesive tapes made by me and as heretofore described. Preferably this comprises a film or sheet of gelatinized cellulosic material carrying a layer of adhesive, which is in elastic adhesive equilibrium with the tape forming the backing material. My invention contemplates the sealing of the overlapping edges 11 to render the contents of the package airproof and waterproof, to avoid losses of the moisture of the contents of the package and to prevent atmospheric moisture or humidity from altering the contents of the package. For this purpose, I interpose between the transparent tape 12, the film of adhesive material which is in elastic equilibrium with the backing material, and set the tape over the superimposed edges of the package. This will in no way alter the display of the highly polished and lustrous finish of the package, and the transparency of the composite, particularly where this type of adhesive layer is utilized, will be maintained.

The tape 12 as contemplated by me in the aforementioned illustration carries an adhesive coating which is normally dry, of the compositions herein described and is activated to adhesiveness just before application, as by contacting by an organic volatile solvent, depending upon the nature of the adhesive coating. Where the coating serves in the nature of a waterproof sealing coat for the transparent gelatinized cellulosic material, such as regenerated cellulose, the organic volatile solvent moistening ingredient which is chosen is one which will energize this coating and render it adhesive. While it is contemplated by me, where a highly polished and lustrous packaging material, comprising regenerated cellulose, with waterproof coatings comprising gelatinized cellulosic compounds, such as pyroxylin or cellulose acetate, as being the character of material which may be used, it is preferred by me to include with the backing material, a waterproof adhesive coating through which the moistening agent quickly strikes and which sets rapidly, of the character hereinbefore described and comprising a rubber and resin mixture as the base.

Where a sheet of tape or packaging material of transparent material, comprising a film or layer of regenerated cellulose coated with a cellulosic compound to waterproof the regenerated cellulose and comprising plasticized pyroxylin is used either as the packaging material or the tape, the process for sealing the package may include moistening the plasticized layer of the cellulosic compound with a solvent for this layer, such as a mixture of the acetone and amyl acetate, which temporarily dissolves the plasticized pyroxylin coating. However, as the proportioning of the solvents used to activate to adhesiveness the waterproofing film, in drying may cause blushing and thereby altering of the appearance of the package as to its lustrous, highly polished and transparent characteristics, it is preferred by me to utilize either upon the packaging material itself, with or without cellulosic compounds such as plasticized nitrocellulose, or upon the backing material of the character herein described, the adhesive materials indicated herein under formulae above mentioned, preferably as in the examples heretofore indicated, by a modification, where it is desirable, by the application of a primer coat preceding the adhesive coat.

In the illustration, where I utilize a tape which is clear and transparent, and the composite carried thereby is equally clear, transparent, and in elastic equilibrium with the superimposed edges of the packaging material and the tape, the general appearance of the entire article will be the same and at the same time the entire contents of the package are sealed against ingress of atmospheric moisture and water, as well as serving to seal the contents of the package from losses due to evaporation from within.

In Figure 3 I have illustrated the application of the sealing member as contemplated by me to a package 15, comprising paper having printed matter shown thereon, as at 16. Edges of the packaging material comprising this printed paper are shown to overlap at 17. Over the superimposed edges I may apply a sealing member 18. This sealing member or tape comprises a transparent backing material including an adhesive coating of the character hereinbefore described, which may be activated by moistening to an adhesive condition. A seal as thus provided serves to properly fasten and bind the overlapping edges of the packaging wrapper. This is effectively done by reason of the adhesive coating chosen and where a backing material is utilized which is transparent, the printed matter appearing on the wrapper will be clearly visible therethrough. Thus, by my invention, paper wrappers having printed matter may be employed and this wrapper may be sealed effectively by a transparent adhesive tape serving to effectively bind the edges of the wrapper utilized, without marring or detracting from the ornamental surface or the identifying printed matter constituting the wrapper.

In the embodiment illustrated in Figure 4, a package 19 is shown, including an interior wrapper 20. This wrapper may have printing matter of a colored motif and in the example shown, this is shaded for the color green. Where this is used and it is desired to further wrap this interior wrapper 20 with a highly polished, lustrous and transparent wrapping material of the character whose base may be regenerated cellulose, the overlapping edges as shown at 21 are provided with a sealing layer of adhesive 22. This adhesive layer is also preferably of the character which retains the layers of highly polished, lustrous and/or transparent wrapping material in elastic adhesive equilibrium, to maintain this condition. It may, however, be a sealing medium of waterproof characteristics, which has the same color index or color motif appearing on the interior wrapper 20. By using an adhesive of the character herein generally referred to in Example D, this may be readily accomplished and provide a package in which the highly polished, lustrous wrapping material has its edges united in elastic adhesive equilibrium, to retain this desirable characteristic, and with a color index or hue of the same character as the interior or decorative wrapper.

In either the embodiment of Figure 3 or that of Figure 4, the adhesive coating is activated by a suitable organic solvent or mixture of organic solvents. The method of packaging utilizing the both materials is set forth in my Patent #2,183,330, issued December 12, 1939 upon my application, S. N. 675,289 filed concurrently herewith.

In general, it will be observed that I accomplish a sealing of the adjacent layers of edges for packaging by a dissolving action of the fabric itself, constituting the packaging material and with a highly polished and lustrous, and/or transparent film of the character described, this is accomplished without altering these desirable properties.

Where, in addition to the waterproofing layers for such sheets as are made from regenerated cellulose, the waterproofing surfaces include the adhesive compositions herein specified, activation or dissolution of these surfaces result in adhesion of contacting surfaces with a speed of operation heretofore unattained. The adhesive action is accomplished with a preservation of the desirable characteristics of the packaging material and even to the point of augmenting these desirable qualities by imparting a pigmenting action, carrying forward the general color motif of the package to which it is applied, in addition to other desirable properties previously indicated. The packaging materials have their utility extended in that their airproof and moistureproof qualities are augmented by providing seals which are as efficient in these properties as are the packaging materials themselves or the parts which the seals unite.

This application is a continuation-in-part of my prior filed application Serial No. 534,386, filed May 1, 1931, issuing concurrently as Patent #2,331,894.

Reference is also made to my application, S. N. 333,136 filed May 3, 1940 which issued as Patent #2,328,066 on August 31, 1943.

Having thus described my invention and illustrated its use, what I claim as new and desire to secure by Letters Patent is:

1. As a new article of manufacture, an adhesive sheet comprising a cellulosic backing material, a normally dry, water insoluble adhesive coating united thereto, said coating being responsive to the moistening action of a volatile organic solvent, said adhesive coating comprising a rubber base material, said adhesive being normally non-tacky whereby sheets of said product may be formed into rolls without promiscuous adhesion between the layers of the composite.

2. As a new article of manufacture, an adhesive sheet comprising a cellulosic backing material, a normally dry, water insoluble adhesive coating united thereto, said coating being responsive to the moistening action of a volatile organic solvent, said adhesive coating comprising a rubber-resin composition, said adhesive being normally non-tacky whereby sheets of said product may be formed into rolls without promiscuous adhesion between the layers of the composite.

3. As a new article of manufacture, an adhesive sheet comprising a transparent, gelatinized cellulosic backing material and an adhesive coating united thereto comprising a normally dry, water insoluble and waterproof material, said adhesive coating being responsive to the moistening action of a volatile organic solvent to render it adhesive, the composite including the backing material being resistant to said moistening action, to retain the same in the transparent condition aforesaid, said adhesive being normally non-tacky whereby sheets of said product may be formed into rolls without promiscuous adhesion between the layers of the composite.

4. As a new article of manufacture, a transparent sheet of cellulosic material for covering or packaging provided with discontinuous coatings having defined areas, said coating comprising a water insoluble component including a rubber base material and being normally non-tacky whereby sheets of said product may be formed into rolls without promiscuous adhesion between layers of the composite.

5. As a new article of manufacture, an adhesive sheet comprising a cellulosic backing material, a normally dry, water-insoluble adhesive coating united thereto, said coating being responsive to the moistening action of a volatile organic solvent, said adhesive coating comprising a rubber-resin composition containing dispersed particles of dried hydrophilic gel, said adhesive being normally non-tacky whereby sheets of said product may be formed into rolls without promiscuous adhesive between the layers of the composite.

RICHARD GURLEY DREW.